United States Patent [19]
Peruski

[11] Patent Number: 5,542,517
[45] Date of Patent: Aug. 6, 1996

[54] BALANCE DAM RETURN SPRING FOR FRICTION ELEMENT OF AN AUTOMATIC TRANSMISSION

[75] Inventor: Nancy A. Peruski, Monroe, Mich.

[73] Assignee: Ford Motor Company, Dearborn, Mich.

[21] Appl. No.: 349,295

[22] Filed: Dec. 5, 1994

[51] Int. Cl.$^6$ .............................................. F16D 25/0638
[52] U.S. Cl. .................................. 192/85 AA; 192/106 F
[58] Field of Search ........................... 192/85 AA, 106 F

[56] References Cited

U.S. PATENT DOCUMENTS

| | | | |
|---|---|---|---|
| 4,509,627 | 4/1985 | Kawamoto | 192/106 F X |
| 4,732,253 | 3/1988 | Hiramatsu et al. | 192/85 AA X |
| 4,957,195 | 9/1990 | Kano et al. | 192/106 F |
| 5,180,346 | 1/1993 | Carriere . | |
| 5,234,389 | 8/1993 | Goates . | |
| 5,261,862 | 11/1993 | Pierce . | |
| 5,421,439 | 6/1995 | Hayasaki | 192/85 AA |
| 5,439,088 | 8/1995 | Michioka et al. | 192/85 AA |

FOREIGN PATENT DOCUMENTS

Ad.80586  4/1963  France ........................... 192/106 F

*Primary Examiner*—Richard M. Lorence
*Attorney, Agent, or Firm*—Frank G. McKenzie

[57] ABSTRACT

An hydraulically-actuated friction brake or clutch for an automatic transmission includes an hydraulic cylinder (38), a piston (44, 44') displaceable within the cylinder, a rotating shaft (28) on which the piston is supported and sealed, passages (28, 30) supplying actuating pressure to the cylinder, and a Belleville spring (62) fixed against displacement at one end and resiliently displaceable in response to movement of the piston. The piston, shaft, and spring define a sealed space (64), which is filled with hydraulic fluid to produce a centrifugal pressure force on the piston that opposes and balances centrifugal pressure developed within the cylinder.

7 Claims, 2 Drawing Sheets

1

BALANCE DAM RETURN SPRING FOR FRICTION ELEMENT OF AN AUTOMATIC TRANSMISSION

BACKGROUND OF THE INVENTION

1. Field of the Invention

This invention relates to the field of hydraulically-actuated friction clutches and brakes, particularly to those used in automatic transmissions for automotive vehicles.

2. Description of the Prior Art

Hydraulically-actuated friction clutches and brakes used in automatic transmissions frequently include balance dams that provide accurate, consistent control of gear ratio changes. Clutches and brakes respond to the magnitude application of pressurized hydraulic fluid in a cylinder, in which an actuating piston moves due to pressure forces to engage the device and due to a spring force to disengage it.

Balance dams are replacing ball check valves, which are very dependent on angular disposition, ball-to-wall clearance, and flow rate in order to achieve accurate and consistent gear ratio changes. A balance dam creates a centrifugal hydraulic pressure that opposes and balances centrifugal hydraulic pressure developed on the apply side of the piston. These centrifugal pressures are caused by rotation of the entire friction element. In this way, pressure effects, due to the speed of rotation, can be eliminated or reduced to a point where the control system pressure alone creates the force operative to engage the friction element. When the cylinder is vented, a compression spring returns the piston to the disengaged position.

In both the ballcheck and balance dam designs, a spring force is required to return the apply-piston to the disengaged position. In the balance dam design, the return spring force and balance dam centrifugal force act in the same direction to return the apply-piston to the disengaged position and to hold it there.

SUMMARY OF THE INVENTION

It is preferable to employ a Belleville return spring and to incorporate a seal between the friction element piston and its spring in order to create a sealed space containing hydraulic fluid. Hydraulic pressure developed in this space eliminates the need for a separate balance dam, yet it permits development of a centrifugal pressure force acting in opposition to the centrifugal pressure force developed on the apply side of the piston of the friction element.

A friction element, according to this invention, for engaging and disengaging a drive connection between elements of an automatic transmission includes a first member having a first set of friction discs drivably connected thereto and displaceable thereon; a second member having a second set of friction discs drivably connected thereto, each disc of the second set located between a disc of the first set; a pressure plate for limiting displacement of the first and second sets of friction discs; a cylinder; a piston located in the cylinder and supported for displacement in the cylinder, having a member extending axially toward the friction disc sets and defining an axially extending third surface thereon, the piston producing a drive connection between the first and second sets of friction discs and the first and second members as said member is forced into contact with a friction disc. A spring having a first surface fixed against displacement, resiliently resists displacement of the piston, the spring and piston defining a chamber therebetween. An O-ring located in the recess, is urged by the spring into resilient contact therewith. A seal carried on the spring, urged by the spring into resilient contact with the third surface, seals the chamber as the piston moves in the cylinder.

When the cylinder is pressurized, a force is developed on the outer vertical wall of the piston, thereby moving the piston and forcing the sets of friction discs into mutual drivable engagement. When a space located on the opposite side of the piston from the apply pressure is filled with fluid, a centrifugal pressure is developed in opposition to the centrifugal pressure in the apply-piston. The forces these pressures develop on the piston have substantially identical magnitude and opposite direction; therefore centrifugal pressure forces on opposite sides of the piston are substantially balanced. In this way, the response of the friction element to supply pressure is more certain and repeatable than if no balancing pressure were present on the opposite side of the apply-piston.

DESCRIPTION OF THE PREFERRED EMBODIMENT

Figure 1:
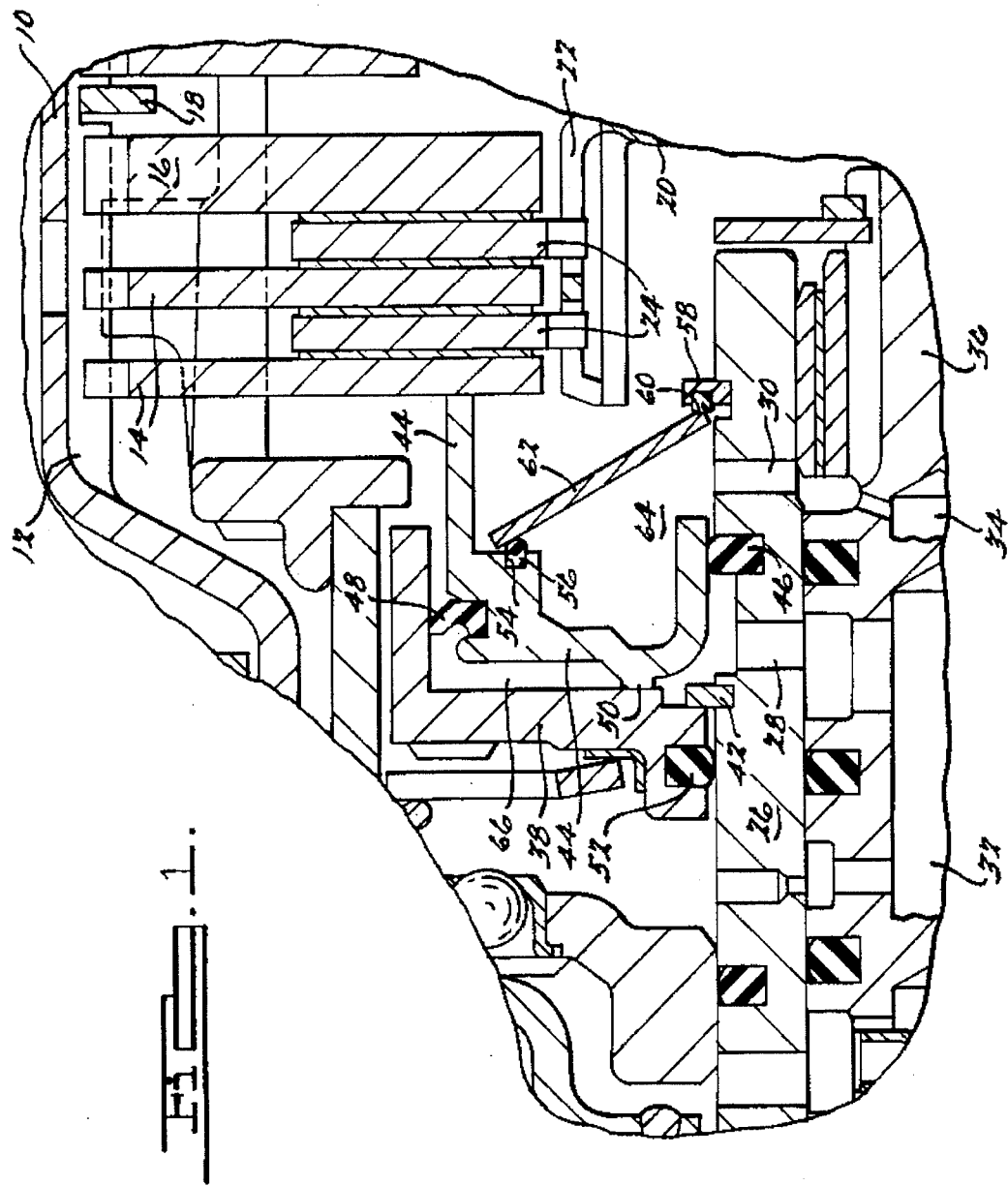
FIG. 1 is a cross section through a portion of the kinematic arrangement of an automatic transmission for a motor vehicle to which the present invention is applied.

Referring first to FIG. 1, the elements of a planetary gearset, viz. ring gear, sun gear, planet pinions, and pinion carrier, are selectively held against rotation or drivably connected to other components of another planetary gearset to produce the several gear ratios of an automatic transmission.

A first member 10, drivably connected to a member of a planetary gearset either directly or through operation of a one-way clutch, includes an axially directed spline 12, engaged by a first set of friction discs 14 and by a load block 16 fixed against displacement on member 10 by a snap ring 18.

In the case where the friction element is a clutch, member 10 is rotatably supported; where it is a brake, member 10 is formed integrally with the transmission case or is fixed to the case.

A second member 20, also drivably connected either directly or through a one-way coupling to an element of a planetary gearset, is formed with an external spline 22 on its radially outer surface, the spline engaging a second set of friction discs 24, each disc of the second set located adjacent a disc of the first set 14.

A rotating shaft 26 is formed with radially directed hydraulic passages 28, 30, which communicate with a source of hydraulic pressure through passages 32, 34 formed in a shaft 36, surrounded by the rotating shaft 26.

An hydraulic cylinder 38 is fixed against displacement with respect to shaft 26 by a snap ring 42 resiliently retained within recesses formed on the outer surface of shaft 26 located at opposite axial sides of the cylinder.

Located within hydraulic cylinder 38 is a piston 44, supported on shaft 26 for sliding displacement within the cylinder and sealed against the passage of hydraulic fluid by a seal 46. Piston 44 carries an hydraulic seal 48, which resiliently contacts the inner cylindrical surface of cylinder 38, thereby sealing the space bounded by the cylinder, piston, and seal 48 against passage of hydraulic fluid supplied through passage 28. Leftward displacement of piston 44 is limited by contact between the inner surface of cylinder 30 and an annular boss 50 located on the outer surface of piston 44. The space between cylinder 38 and shaft 26 is sealed against passage of hydraulic fluid by hydraulic seal 52. The piston is formed with an annular recess 54, within which an O-ring seal 56 is located.

The radially outer surface of shaft 26 is formed with a recess that receives a snap ring 58 contacted by a first surface 60 of a Belleville spring 62 to hold the spring in position and limit its axial displacement. The spring 62 is in the form of a truncated cone formed of spring steel, which bears against the O-ring 56, thereby annularly sealing the radially outer extremity of spring 62 and the adjacent inner face of piston 44 against the passage of hydraulic fluid. Contact between surface 60 of the Belleville spring 62 and snap ring 56, may partially seal the radially inner end of the spring against the passage of hydraulic fluid, or as shown in FIG. 1, the snap ring may be formed with a recess that contains an O-ring so that the radially inner end of the spring 62 is sealed fully against the passage of hydraulic fluid.

The space 64 bounded by the inner surface of piston 44, the radially outer surface of shaft 26, and spring 62 is filled with hydraulic fluid through passage 30 when pressurized hydraulic fluid is supplied through passage 28 to space 66 located on the apply side of piston 44. If leakage of fluid past the circumferential discontinuity in snap ring 58 occurs; therefore, space 64 is continually supplied with pressurized fluid to maintain that space filled. Alternatively, a seal is formed on snap ring 58 so that spring 62 is fully sealed at its radially inboard end. The space 64 is filled when space 66 is pressurized, but space 64 need not be continually replenished because leakage is negligible.

Figure 2:
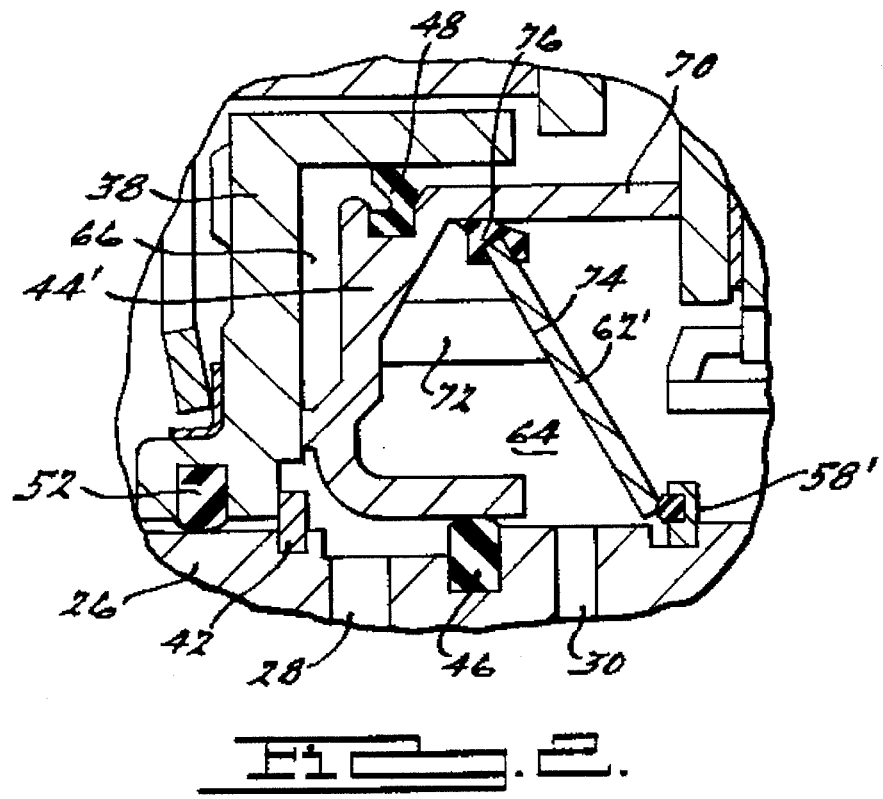
FIG. 2 is a partial cross section through a friction element showing an alternate embodiment of the present invention.

Referring to the embodiment of FIG. 2, piston 44' includes an axially extending arm 70 that moves into contact with a friction disc 14 when space 66 is pressurized, thereby forcing the first and second sets of friction discs 14, 24 into mutual driving contact against the resistance of pressure plate 16. This action produces a drivable connection between members 12 and 22.

Piston 44' includes an arm 72 extending axially within space 64 and defining an inclined surface 74 at its axial extremity against which Belleville spring 62' is held in contact. The radially outer end of spring 62' carries an hydraulic seal 76, which resiliently contacts the cylindrical surface formed on the radially inner surface of the axially extending arm 70 of piston 44', thereby sealing space 64 against the passage of hydraulic fluid at the radially outer end of the spring.

Contact between surface 74 and the spring establishes the slope of the spring and causes the spring to pivot about its radially inboard contact on snap ring 58' as piston 70 is displaced axially within cylinder 38 when pressure is applied to space 66.

Figure 3:
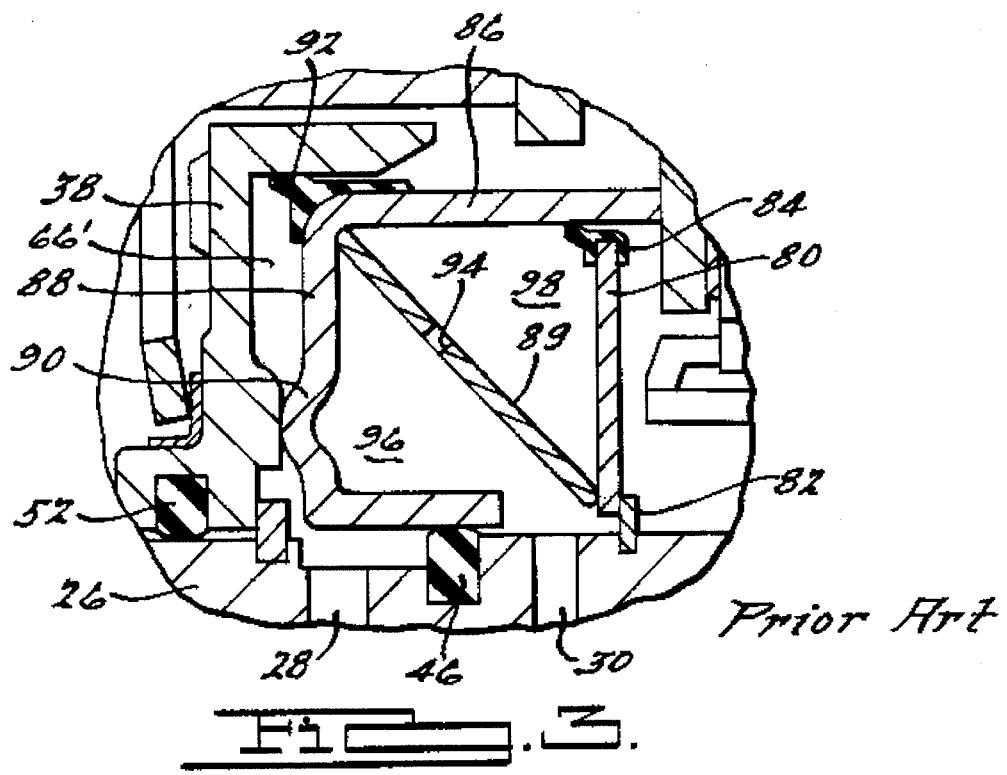
FIG. 3 is a cross section of a portion of a friction element known from the prior art.

Referring now to FIG. 3, a conventional friction element, such as an hydraulically-actuated friction clutch or brake for an automatic transmission, includes a balance dam 80 fixed against displacement due to contact with a snap ring 82. The radially outer end of the dam 80 carries an hydraulic seal 84 for sealing the cylindrical inner surface of an apply-piston 90 against passage of hydraulic fluid. A Belleville spring 89 contacts balance dam 80 at its radially inner end and contacts the radial wall 88 of the apply-piston 90, which carries an hydraulic seal 92 for sealing the interface between the inner surface of cylinder 38 and the outer surface of the piston. The Belleville spring is formed with slots 94 so that spaces 96, 98, located on opposite sides of the spring communicate pressurized hydraulic fluid supplied through passage 30 formed in rotating shaft 26.

In operation of the embodiments of FIGS. 1 and 2, when cylinder 38 is pressurized, an apply force is developed on the outer vertical wall of the piston, causing it to move rightward and to force the sets of friction discs 14, 24 into mutual drivable engagement. When space 66 is pressurized, pressure induced by centrifugal force is developed within the cylinder. The centrifugal pressure adds to the magnitude of the pressure supplied through passage 28. By filling space 64 with hydraulic fluid, a corresponding centrifugally induced pressure is developed on the right-hand radial wall of the piston. That pressure has a magnitude substantially identical to the pressure associated with the centrifugal pressure developed in space 66; therefore, the centrifugal pressure forces on opposite sides of the piston are substantially balanced. In this way, the response of the friction element to the apply pressure is more predictable than if a pressure force were present due to centrifugal pressure developed in space 66 without a corresponding balancing centrifugal pressure developed in space 64.

It is understood that while the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

I claim:

1. A friction element for engaging and disengaging a drive connection, comprising:

a first member having a first set of friction discs drivably connected thereto;

a second member having a second set of friction discs drivably connected thereto, each disc of the second set located between a disc of the first set;

a cylinder;

a pressure plate for limiting displacement of the first and second sets of friction discs;

a piston located in the cylinder, supported for displacement toward and away from the friction disc sets, producing a drive connection between the first and second sets of friction discs and the first and second members;

a spring having a first surface fixed against displacement, said spring resiliently resisting displacement of the piston, the spring and piston defining a chamber therebetween; and means for hydraulically sealing the chamber against passage of hydraulic fluid.

2. The friction element of claim 1, further comprising:

a source of pressurized fluid;

a first passage hydraulically connecting the fluid pressure source and the cylinder; and a second passage hydraulically connecting the fluid pressure source and the chamber.

3. The friction element of claim 1, further comprising:

a snap ring fixed against displacement; and wherein the spring is a Belleville spring of truncated conical form contacting the snap ring and extending axially toward the piston, the sealing means being resiliently contacted by the spring.

4. The friction element of claim 3, wherein the sealing means includes:

a recess formed on the piston; and an O-ring located in the recess, urged by the spring into resilient contact therewith.

5. The friction element of claim 3, wherein the sealing means includes:

a seal carried on the spring, urged by the spring into resilient contact with an axially extending surface of the piston, sealing the chamber as the piston moves in the cylinder.

6. A friction element for engaging and disengaging a drive connection, comprising:

a first member having a first set of friction discs drivably connected thereto;

a second member having a second set of friction discs drivably connected thereto, each disc of the second set located between a disc of the first set;

a cylinder;

a pressure plate for limiting displacement of the first and second sets of friction discs;

a piston located in the cylinder, supported for displacement in the cylinder, having a member extending axially toward the friction disc sets and defining an axially extending surface thereon, the piston producing a drive connection between the first and second sets of friction discs and the first and second members as said member is forced into contact with a friction disc;

a spring fixed against displacement, said spring resiliently resisting displacement of the piston, the spring and piston defining a chamber therebetween;

an O-ring located in a recess, urged by the spring into resilient contact therewith; and a seal carried on the spring, urged by the spring into resilient contact with said surface, sealing the chamber as the piston moves in the cylinder.

7. A friction element for engaging and disengaging a drive connection, comprising:

a first member having a first set of friction discs drivably connected thereto;

a second member having a second set of friction discs drivably connected thereto, each disc of the second set located between a disc of the first set;

a cylinder;

a pressure plate for limiting displacement of the first and second sets of friction discs;

a piston located in the cylinder, supported for displacement in the cylinder, having a member extending axially toward the friction disc sets and defining an axially extending surface thereon, and a recess, the piston producing a drive connection between the first and second sets of friction discs and the first and second members as said member is forced into contact with a friction disc;

a spring fixed against displacement, said spring resiliently resisting displacement of the piston, the spring and piston defining a chamber therebetween; and a seal carried on the spring, urged by the spring into resilient contact with said surface, sealing the chamber as the piston moves in the cylinder.

* * * * *